United States Patent [19]

Lamprecht et al.

[11] Patent Number: 4,872,890
[45] Date of Patent: Oct. 10, 1989

[54] MULTI-STAGE GAS-ENTRAINED LIQUID SEPARATOR

[75] Inventors: Ned L. Lamprecht, Rocky River, Ohio; Clyde W. Hawley, Chester, Va.

[73] Assignee: Dollinger Corporation, Richmond, Va.

[21] Appl. No.: 270,022

[22] Filed: Nov. 14, 1988

[51] Int. Cl.⁴ .................................... B01D 46/02
[52] U.S. Cl. ................................. 55/323; 55/337; 55/487
[58] Field of Search .................. 55/320–323, 55/337, 345, 487

[56] References Cited

U.S. PATENT DOCUMENTS

| | | | |
|---|---|---|---|
| 1,522,903 | 1/1925 | Pabodie . | |
| 2,432,130 | 12/1947 | Serrell et al. | 184/6 |
| 3,494,110 | 2/1970 | Reed et al. | 55/316 |
| 3,548,569 | 12/1970 | Jepsen et al. | 55/242 |
| 3,732,669 | 5/1973 | Chambers | 55/321 |
| 3,870,493 | 3/1975 | Kall et al. | 55/391 |
| 3,886,854 | 6/1975 | Cupepper, Jr. | 98/115 |
| 4,086,070 | 4/1978 | Argo et al. | 55/97 |
| 4,092,137 | 4/1978 | Howe et al. | 55/337 |
| 4,158,449 | 6/1979 | Sun et al. | 244/136 |
| 4,172,710 | 10/1979 | Van der Molen | 55/337 X |
| 4,255,099 | 3/1981 | Komori | 418/97 |
| 4,300,918 | 11/1981 | Cary | 55/1 |
| 4,506,523 | 3/1985 | DiCarlo et al. | 62/470 |
| 4,668,252 | 5/1987 | Gerday | 55/320 X |
| 4,668,256 | 5/1987 | Billiet et al. | 55/219 |

Primary Examiner—Charles Hart
Attorney, Agent, or Firm—Fleit, Jacobson, Cohn, Price, Holman & Stern

[57] ABSTRACT

A multi-stage entrained liquid-gas separator includes a housing divided into upper and lower chambers. The lower chamber is provided with a tangential gas-liquid stream inlet into an annular chamber in which the large entrained liquid drops are centrifugally impinged upon the chamber wall and drained into a lower sump. From the annular inlet chamber the gas-liquid stream is caused to abruptly change direction and flow into a lower-pressure area of the lower chamber for further releasing entrained droplets. From this area the gas-liquid stream is made to flow into an inner chamber provided within the lower chamber and communicating with the upper chamber. A preseparator housed in the inner chamber separates by impingement and coalescence liquid droplets still entrained in the gas-liquid stream and drains the coalesced liquid into an inner sump which in turn drains via a trap into the lower sump. From the preseparator, the gas stream still containing liquid microdroplets is conveyed upwardly into the upper chamber and through a two-stage principal separator in the first, fine upstream stage of which the entrained microdroplets are separated by impingement and coalescence from the gas stream and drained to an upper sump. In the second, downstream coarser stage of the principal separator, separated liquid droplets emerging from the upstream stage are prevented by impingement and drainage from becoming re-entrained in the gas stream discharged to the atmosphere via a gas outlet. An embodiment directed to separating oil from gas turbine bearing sump vent air is disclosed.

1 Claim, 3 Drawing Sheets

MULTI-STAGE GAS-ENTRAINED LIQUID SEPARATOR

BACKGROUND AND SUMMARY OF THE INVENTION

This invention pertains to means for the separation of entrained liquids, e.g. aerosols, from gases. By the term "entrained liquids" is meant moisture droplets, oil droplets and the like which are borne as discrete physical particles entrained in a gas as aerosols therein, for example an oil fog.

Various types of apparatus for separating entrained liquids from a gas stream are known in the prior art, directed to particular "de-aeration" applications such as for removing/separating excess entrained lubricating-/cooling oil from the compressed air stream output by an air compressor before the compressed air is supplied to pneumatic machines, or for removing/separating moisture particles from the inlet air stream of a marine gas turbine, or for the separation and/or removal of entrained liquid microdroplets from a process gas stream. Examples of various known gas-entrained liquid separation devices are disclosed in U.S. Pat. Nos. 1,552,903; 2,432,130; 3,494,110; 3,548,569; 3,870,493; 4,086,070; 4,092,137; 4,158,449; 4,255,099; 4,300,918; 4,506,523; 4,548,569; and 4,668,256, the disclosures of which are hereby incorporated by reference hereinto.

As an adjunct to separating the entrained liquid aerosols from the gas stream, it is often desirable that the separated liquid be removed, e.g. for collection and/or reuse. Typically, it is desirable for efficient separation that the liquid, once separated from the gas stream, not be re-entrained as an aerosol in the flow of the gas. As a further adjunct, it is often desirable to clean the gas stream.

Other considerations involved in the separation of entrained liquids from gas streams include the factors of separation efficiency, gas flow velocity, permissible pressure drop, and aerosol particulate size and type. These factors are typically interrelated and may often be interdependent, with one or more factors being critical or paramount and thus dictating the particular priority of design considerations. However, because some factors may conflict with others, the design considerations often require compromises such that some aspects of performance must be traded off in favor of others, and thus the performance is less than ideal. Where many factors must be optimized, the separator design can become complex and costly to implement.

The present invention is directed particularly, but by no means exclusively, to the separation and removal of entrained oil droplets ("oil fog") from an oil-laden air stream venting from a sump bearing of a gas turbine. A significant concern in such an application is compliance with regulations proscribing standards governing the venting/emission of aerosols such as oil fog into the atmosphere. By way of example, it is desired to prevent entrained oil fog from being vented directly into the atmosphere. For compliance with applicable governing standards, it thus becomes desirable to remove sufficient oil fog from a vented oil-laden sump bearing air stream to reduce the residual oil-in-air concentration in the air stream vented to the atmosphere to below the "visible" level, for example below 30 PPM (parts per million).

However, the provision of an apparatus directed to achieving such a level of separation performance must necessarily take into consideration also the factors of air flow volume and velocity, temperature, and tolerable air stream pressure drop, as well as the oil content in the vent air stream, which last factor may not be predictable and which may vary considerably over time. Further, some factors may vary considerably depending upon the turbine operating conditions. Another consideration involves the fact that the entrained oil fog may typically consist of many different sizes of oil droplets.

By the present invention, an apparatus is provided for separating and removing entrained oil droplets from a gas stream, which apparatus includes a preseparator/separator combination which is arranged in a housing means having in a lower part thereof an annular inlet chamber means for admitting and subjecting an entrained oil droplet-laden air stream to centrifugal action, direction reversal and velocity change, for forcing the larger oil droplets out of the air stream by centrifugal force acting thereon and causing the larger oil droplets to impinge on an impingement surface, and then coalescing the impinged oil droplets into a liquid and draining off this separated oil to a sump in the lower part of the housing means.

Then the air stream, still transporting entrained oil droplets, is next conducted to pass through a preseparator means also arranged in the lower part of the housing means and containing an impingement and coalescence medium for causing impingement and coalescence of the transported oil droplets. The preseparator also includes means for collecting the coalesced oil and draining it to the sump in the lower part of the housing means.

After passing through the preseparator means the air stream may still contain residual oil microdroplets. The apparatus further includes a principal separator means arranged in an upper part of the housing means and communicating with the preseparator means. The air stream exiting the preseparator means and still containing residual microdroplets is conducted upward to pass through the principal separator means. The principal separator means is of two stage configuration and includes an upstream stage separator element and downstream stage separator element. The upstream stage separator element promotes coalescence of the residual microdroplets into liquid. The downstream stage separator element prevents, by impingement, the re-entrainment of any now relatively large coalesced oil droplets which may emerge from the upstream stage separator element, and also directs drainage of the coalesced oil to a sump provided in the upper part of the housing means. The air stream, now purged of entrained oil to an acceptable level, is then conducted to flow from an outlet in the upper part of the housing means to be released into the atmosphere.

The sumps in the lower and upper parts of the housing means are provided with drains to be connected to a receiving sump for receiving the separated liquid oil.

BRIEF DESCRIPTION OF THE DRAWINGS

These and other features of the invention will be more fully described in the detailed description which follows, with reference to the drawings, in which.

DETAILED DESCRIPTION OF THE INVENTION

Figure 1:
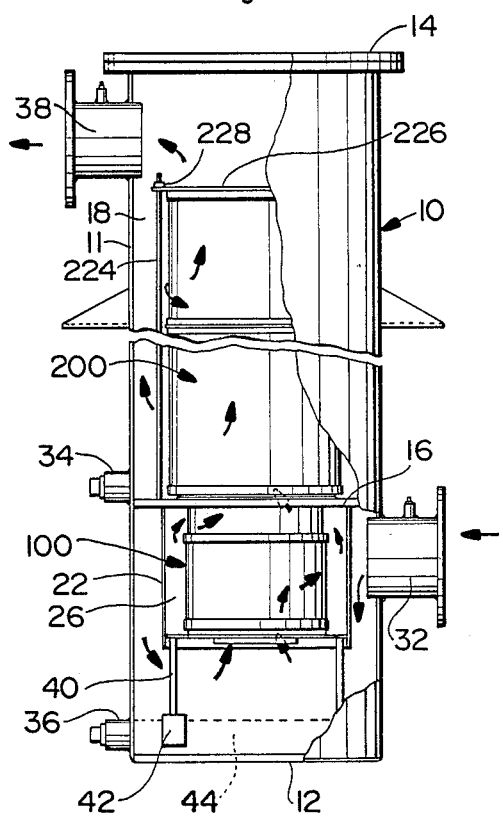
FIG. 1 is a front view, partly broken away, of an exemplary embodiment of a gas-entrained liquid separator according to the present invention.
Figure 2:
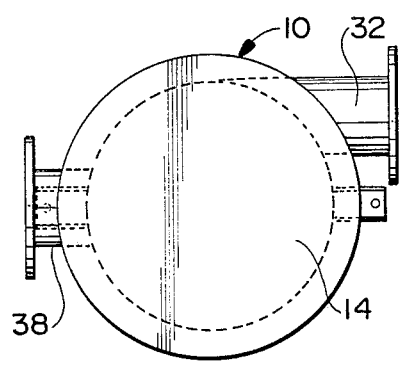
FIG. 2 is a top view of the embodiment of FIG. 1.

Referring to FIG. 1, an exemplary embodiment of a gas-entrained liquid separator according to the invention includes a cylindrical housing means 10 which has a cylindrical outer wall 11 closed by a bottom end 12 and a top lid 14. Housing means 10 is internally subdivided into upper and lower parts by a partition 16. As seen more clearly in FIG. 3, partition 16 is provided centrally with an aperture communicating an upper chamber 18 and a lower chamber 20 defined above and below partition 16, respectively.

Lower chamber 20 is divided by a depending cylindrical inner wall 22 into an annular outer chamber 24 and a cylindrical inner chamber 26. Wall 22 depends only partially from partition 16 into lower chamber 20, and proximate the depending lower end of wall 22 the inner chamber 20 is closed by a bottom wall 28. Bottom wall 28 is centrally provided with an aperture 29 therethrough which is bounded by an upstanding cylindrical wall 30 extending partly upwardly above wall 28 and also depending partly downwardly from wall 28. Aperture 29 thus communicates the outer chamber 24 and inner chamber 26 of the lower chamber 20.

As shown in FIGS. 1-4, the housing means 10 is further provided with a tangential inlet pipe 32 which passes through outer wall 11 proximate the top portion of lower chamber 20 and opens tangentially into annular outer chamber 24 of lower chamber 20 for admitting an oil-laden inlet air stream thereinto. Further, the upper chamber 18 and lower chamber 20 are provided at their respective bottom end portions with drains 34, 36, respectively, communicating with the exterior of the housing means 10. Still further, the housing means 10 is provided proximate the top end thereof with an outlet pipe 38 communicating with the upper chamber 18 for the discharge of the air stream therefrom.

Figure 3:
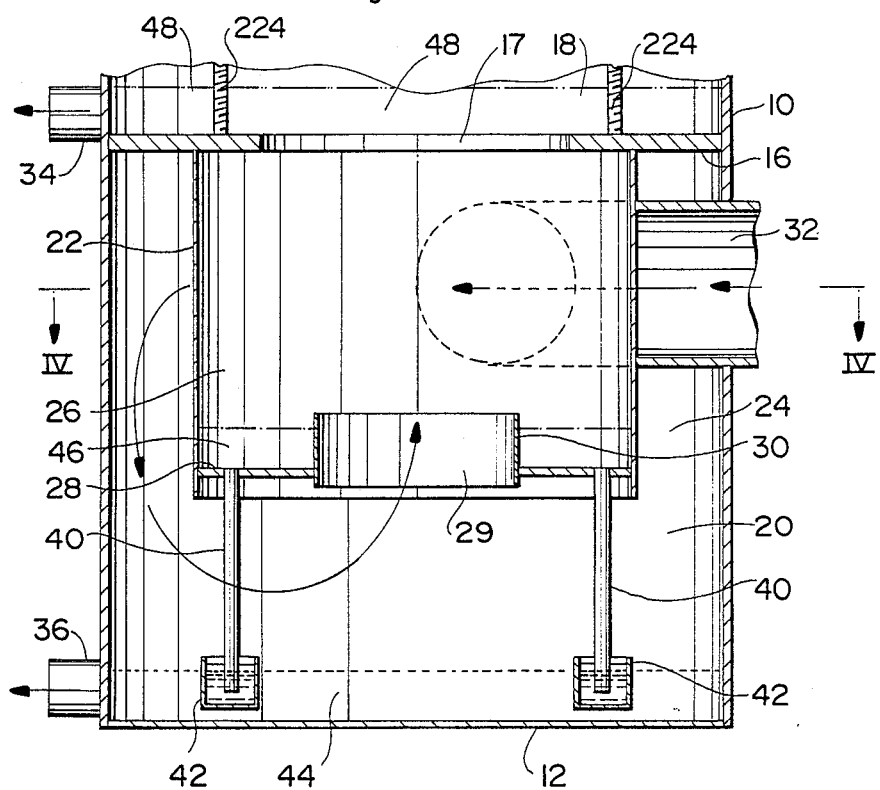
FIG. 3 is a front sectional view of the lower part of the housing means.

As may be seen from FIGS. 1 and 3, the lower chamber 20 is provided with a number of downcomer pipes 40 depending downwardly from bottom wall 28 of inner chamber 26. The lower ends of downcomer pipes 40 are received in cup-like traps 42 in the lower portion of lower chamber 20, the purpose of which will be explained below.

It should be noted that the junctures of the various walls and surfaces are made gas and liquid tight. The closed bottom of the lower chamber serves to provide a lower sump 44, the practical liquid level in which is designated by the dashed line in FIG. 3, and which may be drained via the drain 36. The annular bottom portion of inner chamber 26 defined by walls 22, 28 and 30 serves to form an inner sump 46, the practical liquid level in which is designated by the dot-dash line in FIG. 3. As may be seen, the downcomer pipes 40 drain the inner sump into the lower sump 44, however, drainage from inner sump 46 into lower sump 44 is regulated by traps 40 which are filled with oil, as will be more fully explained below.

Figure 5:
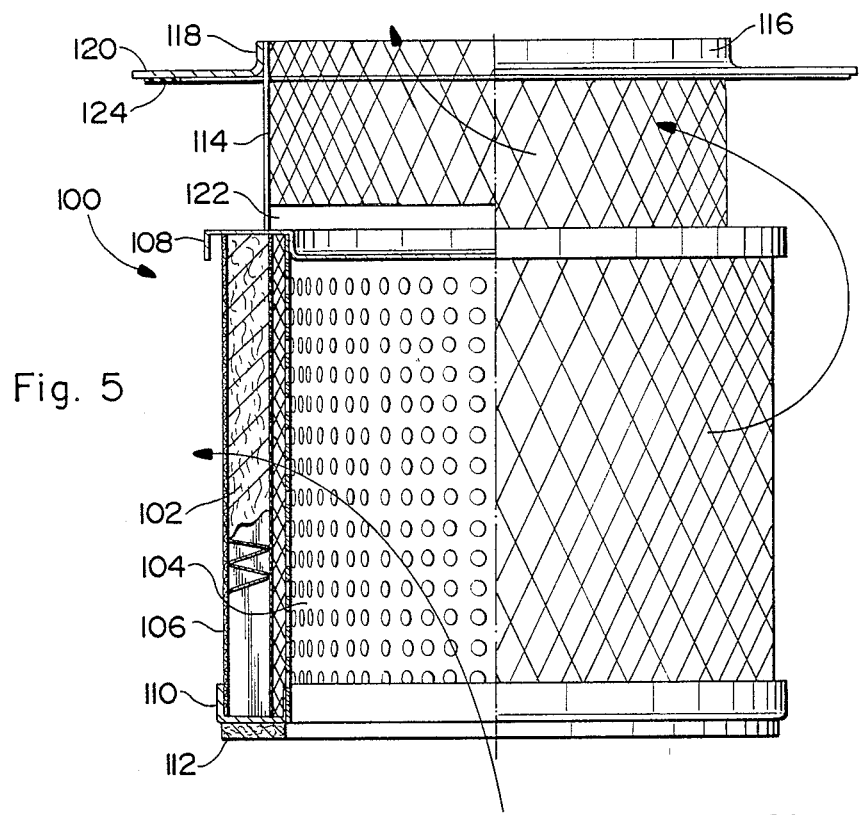
FIG. 5 is a front view in half section of the preseparator means according to the invention.

Referring now to FIGS. 1 and 5, there is shown the preseparator means 100 according to the invention. In use, preseparator means 100 is arranged within the inner chamber 26 of lower chamber 20. The preseparator means 100 includes a cylindrical preseparator element 102 typically of homogeneous glass fiber media which is convoluted to provide sufficient area for proper operation, and having such a fiber size and density as to cause impingement and coalescence of entrained oil droplets thereon and therein, while still permitting uninhibited drainage of collected oil to the inner sump, as will be more fully described below.

Preseparator means 100 further includes cylindrical inner and outer support members 104, 106, typically of freely gas permeable open screening, perforated or expanded material for rigidly supporting the preseparator element 102, and annular channel section upper and lower support flanges 108, 110 for rigidly supporting the inner and outer support members 104, 106 and the preseparator element 102. Lower support flange 110 is provided on its underside with an annular gasket 112 for sealing against the bottom wall 28 of the inner chamber 26. Preseparator element 102, support members 104, 106 and support flanges 108, 110 are sized such that the inner diameter of preseparator means 100 fits with a slight clearance around the throat of the upstanding cylindrical wall 30 communicating the inner chamber 26 with the lower chamber 20, with the preseparator means 100 seated on bottom wall 28. Further, the outer diameter of preseparator means 100 and the inner diameter of cylindrical wall 22 are sized to allow a slight clearance therebetween.

Extending upwardly from the upper support flange 108 there is provided a cylindrical riser or flue 114 of rigid freely gas permeable open screen or perforated or expanded material. Riser 114 is provided at its upper end with an annular flange 116 having a collar portion 118 and a radially extending flange portion 120. Riser 114 also is provided at its lower end with a support collar 122 which may be formed as part of the upper support flange 108. An annular gasket 124 is provided on the underside of the flange portion 120 of flange 116. The radial extent of flange portion 120 is greater than the outer diameter of the preseparator element 102, support members 102, 104, and support flanges 108, 110. Further, the radial extent of flange portion 120 is greater than the diameter of the aperture 17 in the partition wall 16 dividing the upper and lower chambers 18, 20, while the outer diameter of the preseparator element 102, support members 104, 106 and support flanges 108, 110 is smaller than the diameter of aperture 17. In this way, the preseparator means 100 may be inserted into and withdrawn from the inner chamber 26 from above through the aperture 17. The height of the preseparator means 100 from the gasket 112 to the gasket 124 thus corresponds to the distance from the top surface of partition 16 to the top surface of bottom wall 28.

Further, when the preseparator means 100 is seated in the inner chamber, the the upstanding cylindrical collar portion 118 of flange 114 extends above the partition wall 16 to a sufficient extent to form an annular upper sump 48 in the lower end of the upper housing, the practical liquid level of which is designated in FIG. 3 by the dash-double dot line. Thus, the flange 116 of riser 114 prevents liquid collected in the upper sump 48 from flowing down into the inner chamber 26.

Figure 6:
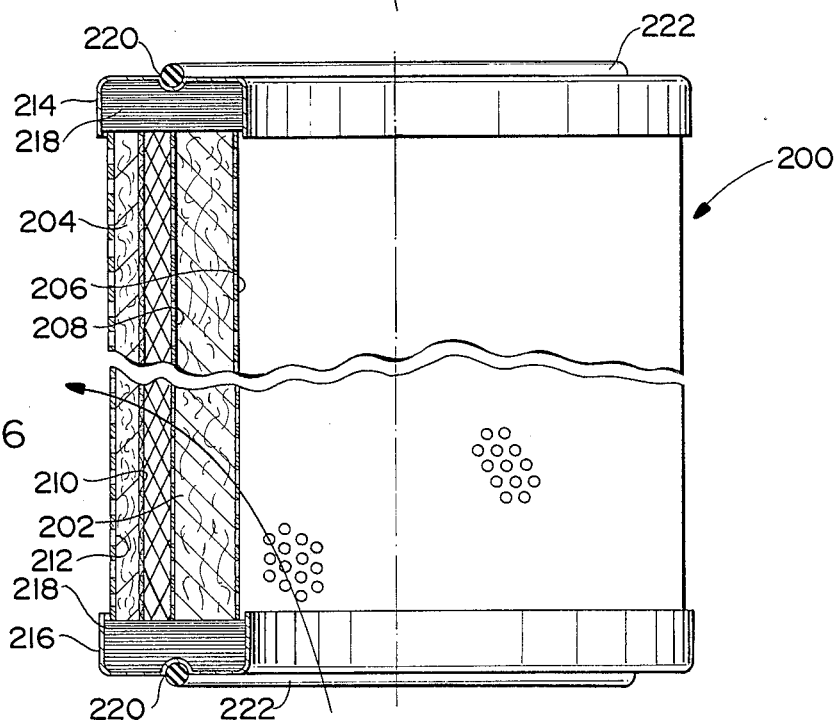
FIG. 6 is a front view in half section of the principal separator means according to the invention.

In FIG. 6 there is shown the principal separator means 200 of the invention. Principal separator means 200 is of two-stage design and includes a cylindrical inner upstream stage separator element 202 and a cylindrical outer downstream stage separator element 204. Upstream stage separator element 202 is preferably formed of a special borosilicate glass fiber media formed into a convoluted configuration to provide adequate flow area in a confined space. The media micro fiber size and density are chosen such as to promote coalescence of residual oil microdroplets in the air stream into liquid. The downstream stage separator element 204 preferably consists of coarser homogeneous glass fibers for preventing, by impingement thereon, the re-entrainment of any coalesced oil droplets that may emerge from the upstream stage separator element 202, and for directing drainage of the collected oil down to the upper sump 48.

The upstream and downstream stage separator elements 202, 204 are each supported by respective cylindrical freely gas-permeable inner and outer support members 206, 208 and 210, 212, respectively, in similar manner as the preseparator element 102. Further, the elements 202, 204 may be mounted for being supported at their respective upper and lower ends within upper and lower annular channel-shaped rims 214, 216 respectively, as by potting sealant 218 or like means.

Upper and lower rims 214, 216 may conveniently be identical and are each provided in the respective upper and lower central surfaces thereof (as oriented in FIG. 6) with circular grooves 220 in which are accommodated O-rings 222 whereby the lowermost rim (216 in FIG. 6) may be sealed down against the upper surface of the radial flange portion 120 of flange 116 of the preseparator means 100 when same is seated on the partition wall 16. Thus, the lower O-ring 222 cooperates with the gasket 124 of radial flange portion 120 to seal the upper sump 48 against draining into the inner chamber 26.

The inner diameter of principal separator means 200 (i.e. of rims 214, 216) is preferably sized slightly smaller than the diameter of aperture 17, but is preferably considerably larger than the outer diameter of the upstanding collar portion 118 of the flange 114 of preseparator means 100, while the outer diameter of the principal separator means 200 is preferably the same as the outer diameter of the radial flange portion 120 of the preseparator means 100.

Rods 224, which are threaded at least over their upper extent, extend upwardly from the partition wall 16 and in spaced relation around the periphery of principal separator means 200. A sealing plate 226 may be clamped sealingly atop the upper O-ring 222 of the upper support rim 214 by nuts 228 or the like fastened to rods 224 for mounting the principal separator means down onto the radial flange portion 120 in the upper chamber 18, with the upper open end of the principal separator means 200 being sealed closed by the sealing plate 226.

Referring again to FIGS. 1-4, the oil-laden air stream, for example vent air from a gas turbine bearing sump containing an entrained oil fog, is conducted to tangential air stream inlet 32 by suitable piping (not shown) and is admitted by inlet 32 into the upper portion of the annular outer chamber 24, the air-oil stream entering the upper annular space of chamber 24 tangentially as shown by the arrows in FIG. 4. This tangential entrance imparts a centrifugal action to the air-oil stream forcing the larger entrained oil drops to impinge on the inner surface of wall 11, coalesce into liquid, and drain into the lower sump 44.

Figure 4:
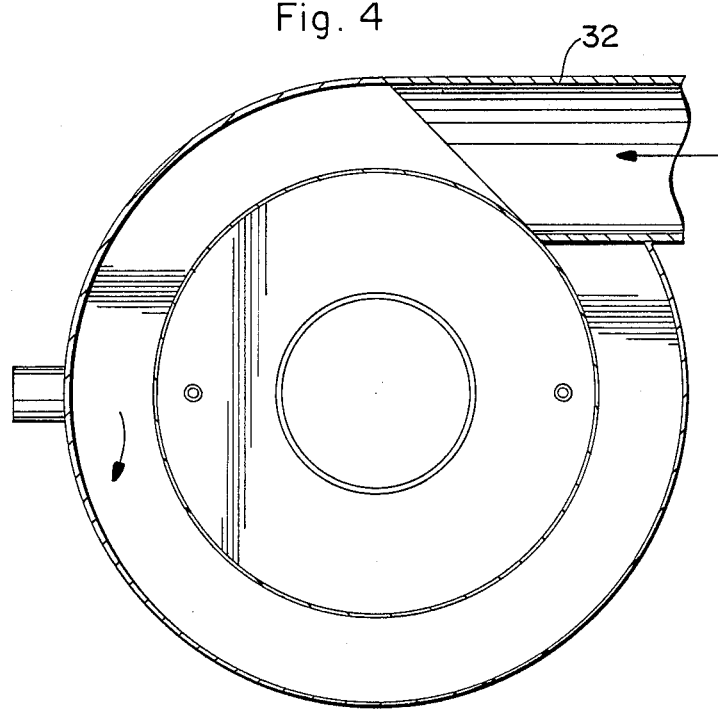
FIG. 4 is a top cross-sectional view of the lower part of the housing means taken along line IV—IV in FIG. 3.

As shown by the arrows in FIGS. 1 and 4, the air stream, still transporting oil droplets, then passes downwardly into the lower chamber 20 and enters a region of reduced flow velocity (i.e. an enlarging volumetric flow path) and also makes an abrupt reversal of flow direction dictated by the arrangement of the depending inner wall 22 within lower chamber 20, which actions cause more oil droplets to be released from the air-oil stream.

The air-oil stream then passes upwardly through aperture 29 and into the inner chamber, and radially outwardly and upwardly through preseparator means 100, as shown by the arrows in FIG. 1. In passing through preseparator element 102, oil droplets in the air-oil stream are caused to impinge and coalesce in and on the element 102, and the coalesced oil drains through and over element 102 and down into inner sump 46 where it is collected. Because the pressure within inner chamber 26 is lower than that in lower chamber 20 due to the pressure drop through the preseparator element 102, provision of traps 42 at the outlets of downcomer pipes 40 prevents the oil collected in lower sump 44 from flowing up into inner sump 46.

The air stream after passingly through the element 102 and still containing residual entrained oil microdroplets, passes inwardly and upwardly into and through the freely permeable riser 114 and is conducted upwardly into the upper chamber 18 whereupon the air-oil steam passes upwardly and radially outwardly through first the upstream separator element 202 and then the downstream separator element 204 of two-stage principal separator means 200. The residual oil microdroplets are promoted to impinge on the fine media of the upstream element 202 and to coalesce into liquid which is drained into the upper sump 48. The upstream element, being coarser, prevents by impingement the re-entrainment of the coalesced and now relatively large oil droplets that may emerge from the upstream element media, and also directs drainage of impinged, coalesced and collected oil droplets to the upper sump 48.

After passing through the principal separator means 200, the air stream, now purged of entrained oil to an acceptable level of concentration, exits from the upper chamber via the outlet 38 and into the atmosphere.

Testing has indicated that whatever arrangement of separator element flow and oil scavenge is used, the successful operation of the apparatus is dependent upon the ability of the scavenge or drain to remove oil from the element sumps as rapidly as the oil is collected. Element flow direction is not in itself critical, but becomes so in the design of a practical system that can provide adequate scavenging, and this factor applies equally to both the preseparator and principal separator arrangements. The upper and lower sump drains 34 and 36 must be connected to a receiving sump (not shown) that is at a lower pressure than either of the upper sump 48 and lower sump 44.

It will be appreciated that the aforedescribed invention is amenable to various modifications and applications and is not to be limited to the exemplary embodiment described and shown, but that various modifications will fall within the scope of the appended claim.

We claim:

1. A multi-stage gas-entrained liquid separator comprising:

housing means having a first chamber and a second chamber separated by a partition and communicable with one another through a first aperture in said partition, said first chamber having an annular passage provided with a tangential gas inlet for admitting an inlet gas-liquid stream in a tangential path thereinto and for imparting centrifugal action upon large liquid droplets entrained in said admitted gas-liquid stream to cause impingement of said entrained large liquid droplets against said housing means, said annular passage opening into said first chamber, said first chamber further being provided with an inner chamber separated from said annular passage and communicable therewith by a second aperture so positioned relative said gas inlet and said annular passage as to impart a change of direction to said admitted gas-liquid stream, said inner chamber also communicating with said first aperture, said second chamber having a gas outlet for discharging a gas stream therefrom, said fisrt chamber, second chamber and inner chambers each having a respective liquid sump at a lower portion thereof;

drain means for draining the respective liquid sumps of the first and second chambers;

means for draining the liquid sump of the inner chamber into the liquid sump of the first chamber;

preseparator means provided in said inner chamber for separating by impingement thereon liquid droplets from said gas-liquid stream and for coalescing and draining said separated liquid into said inner sump, and for conducting said gas-liquid stream through said first aperture into said second chamber; and two-stage principal separator means provided in said second housing for separating by impingement and coalescence thereon liquid microdroplets entrained in said gas-liquid stream admitted thereto from said preseparator means and for preventing by impingement re-entrainment of coalesced liquid droplets therefrom into a gas stream discharged therefrom.

* * * * *